April 14, 1970  B. R. BODELL  3,505,686
DEVICE FOR EFFECTING BLOOD INTERCHANGE FUNCTIONS
Filed March 8, 1965  4 Sheets-Sheet 1
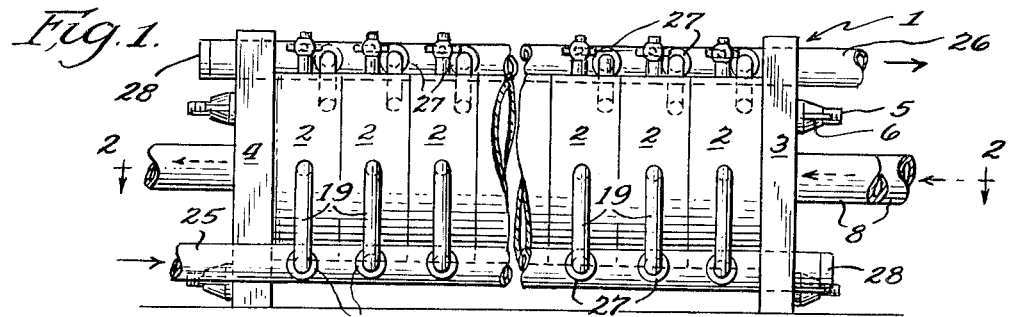
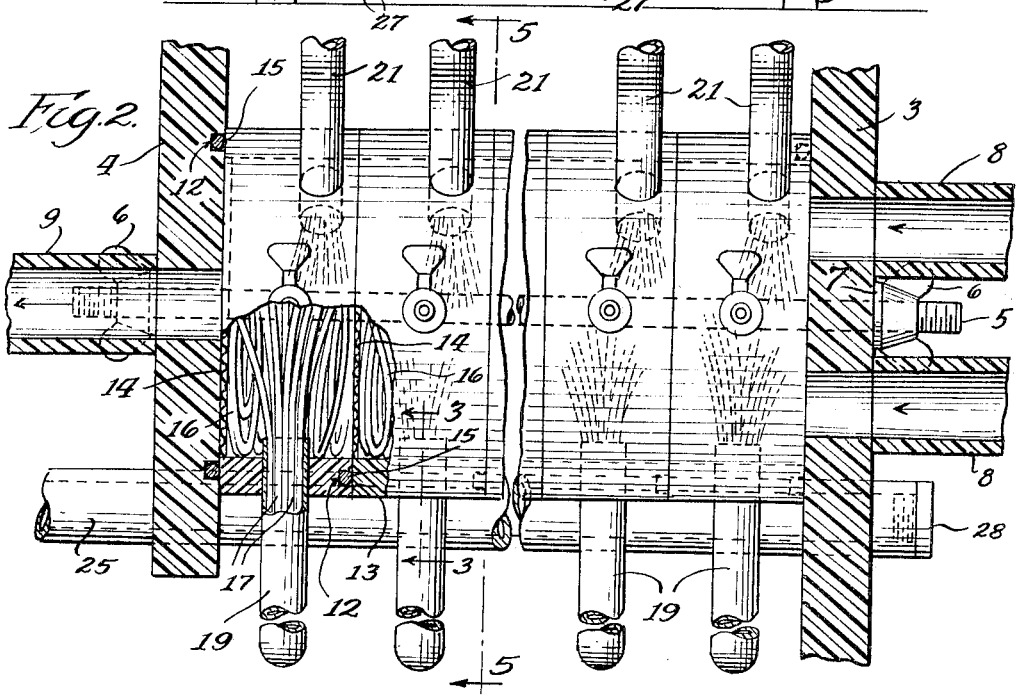
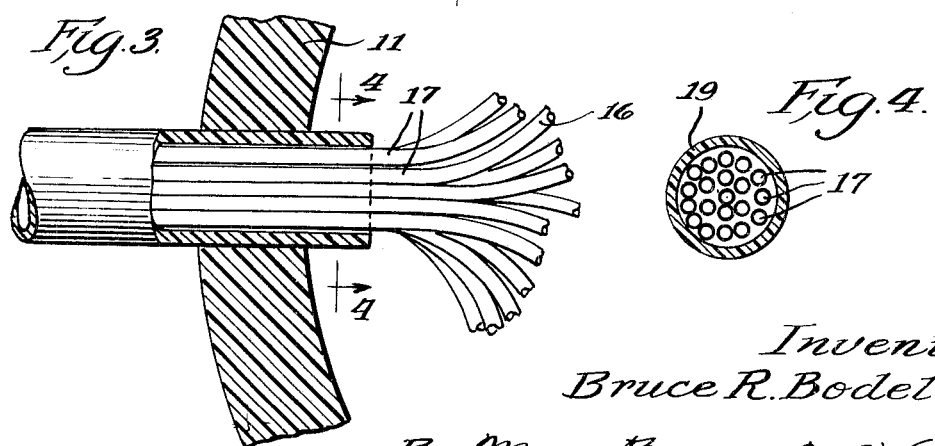
Inventor
Bruce R. Bodell
By Mann, Brown & McWilliams
Attys

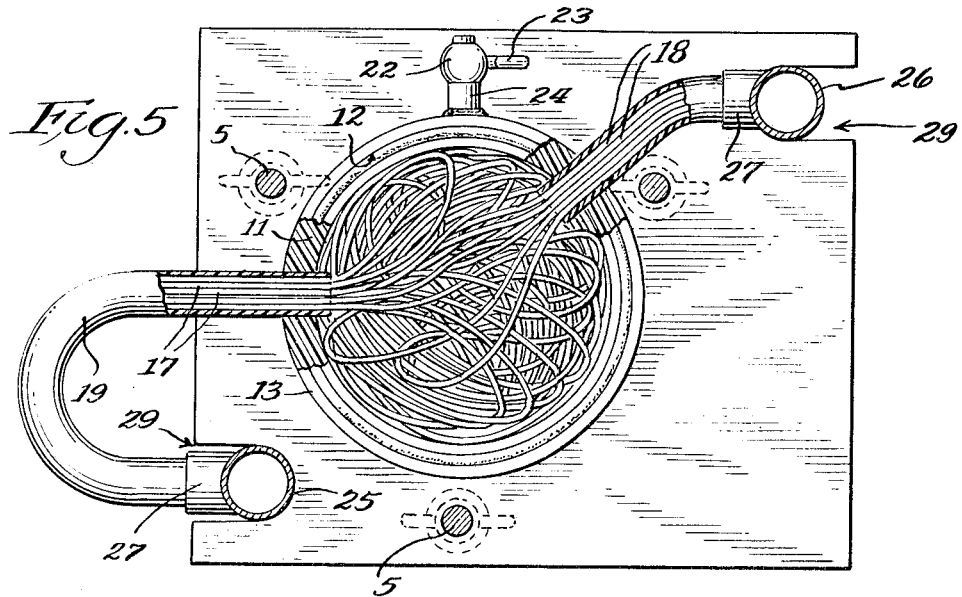
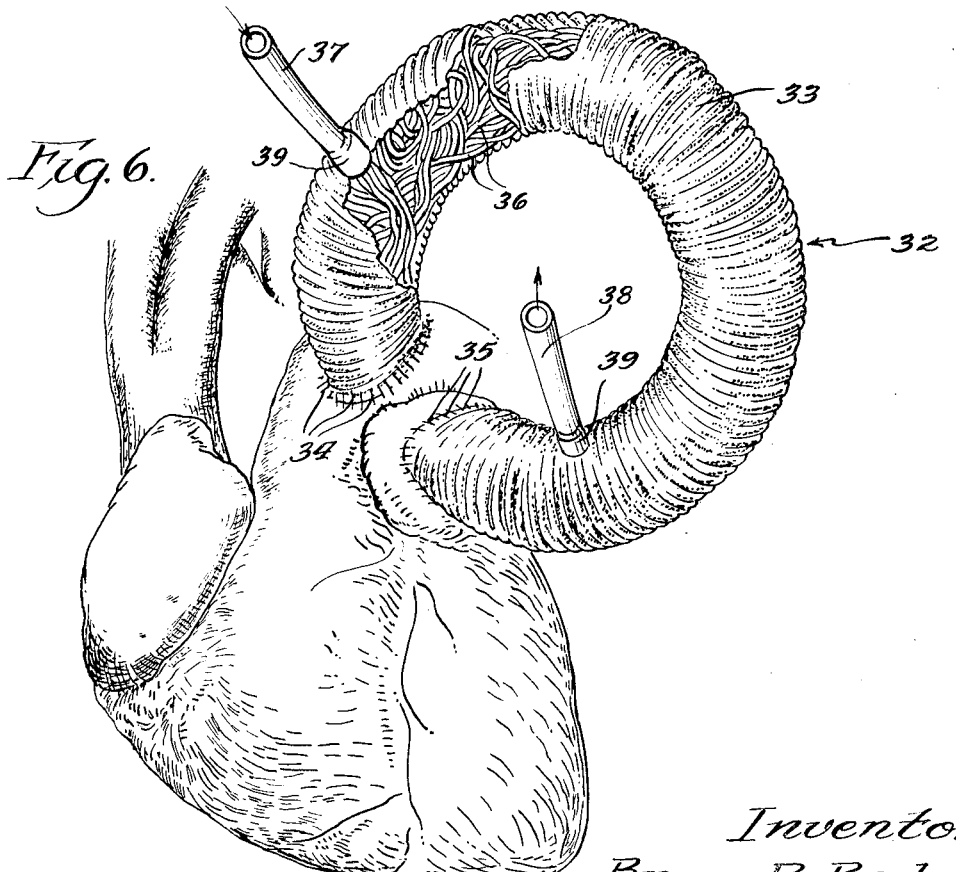

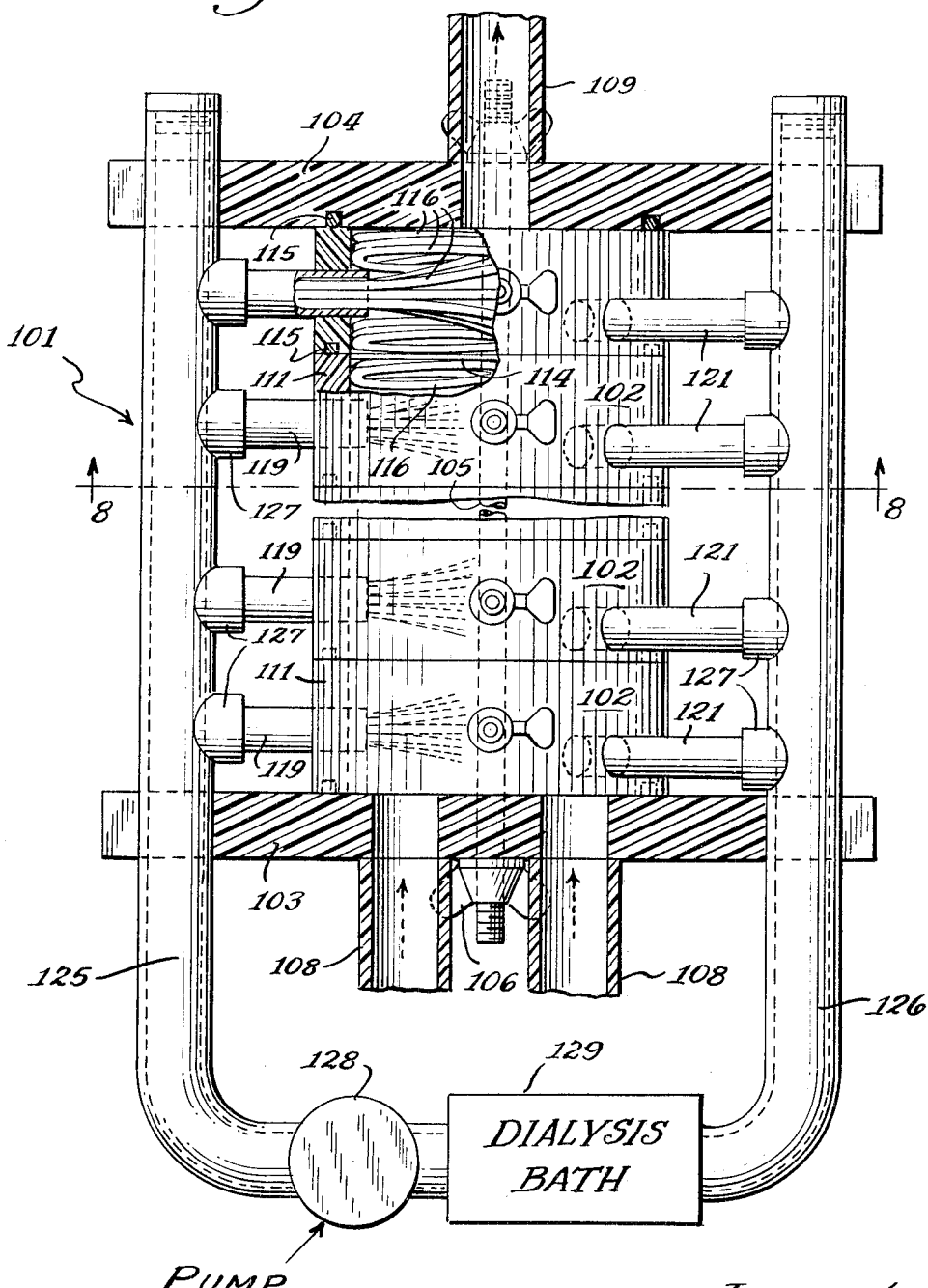

April 14, 1970  B. R. BODELL  3,505,686
DEVICE FOR EFFECTING BLOOD INTERCHANGE FUNCTIONS
Filed March 8, 1965  4 Sheets-Sheet 4
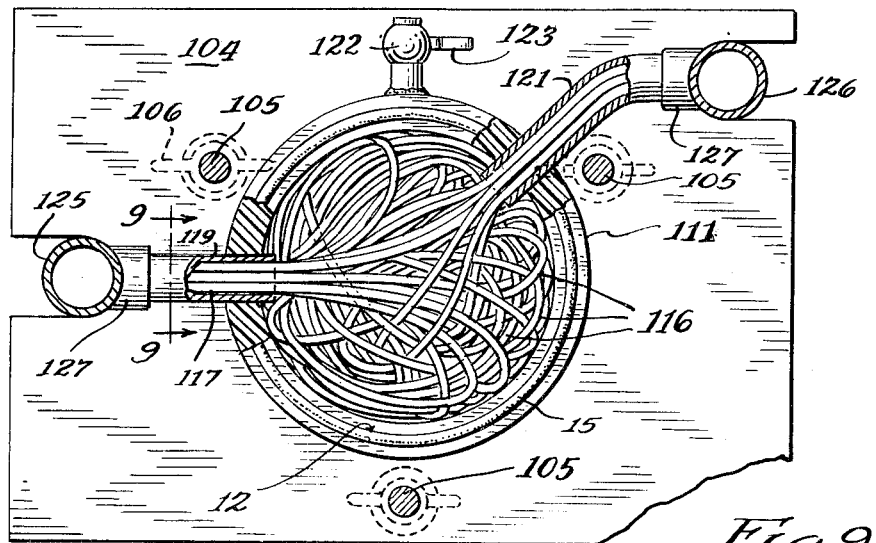
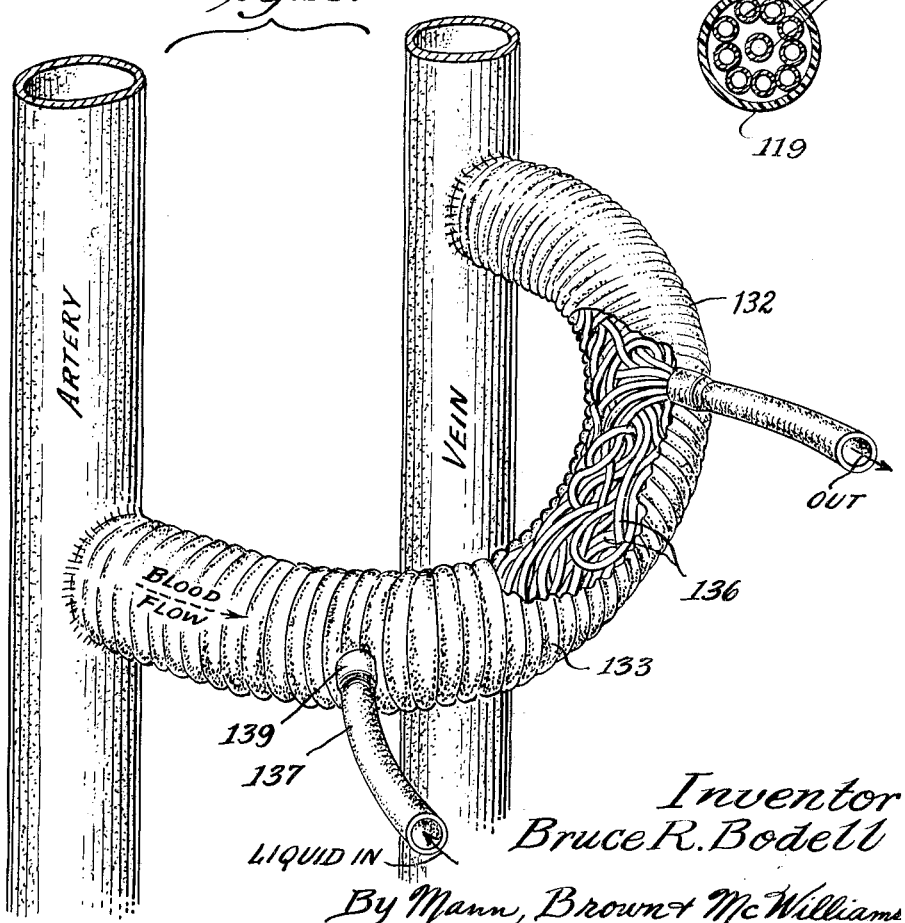
Inventor
Bruce R. Bodell
By Mann, Brown & McWilliams
Attys.

United States Patent Office 3,505,686
Patented Apr. 14, 1970

3,505,686
DEVICE FOR EFFECTING BLOOD INTERCHANGE
FUNCTIONS
Bruce R. Bodell, 808 Park Ave.,
River Forest, Ill. 60305
Continuation-in-part of application Ser. No. 247,994,
Dec. 28, 1962. This application Mar. 8, 1965, Ser.
No. 438,027
Int. Cl. A61f 1/00; A61m 1/03; B07b 1/28
U.S. Cl. 3—1                                   13 Claims

ABSTRACT OF THE DISCLOSURE

Extracorporeal and implantable blood interchange devices used for the oxygenation of blood or the removal of undesirable components therefrom and characterized by the use of a multitude of parallel-connected capillary tubes of silastic or similar material with the oxygen or other purifying fluid being flowed through the capillary tubes, and with the blood to be purified or oxygenated being in close physical contact with the exterior surfaces of the tubes.

---

This application is a continuation-in-part of my copending application Ser. No. 247,994 filed Dec. 28, 1962 which was in turn filed as a continuation-in-part of application Ser. No. 127,056 filed July 26, 1961, both now abandoned.

This invention relates generally to interchange functions involving the blood and relates more particularly to diffusion membrane structures which, for example, include an artificial lung to perform blood oxygenating functions and an artificial kidney to perform the waste eliminating actions thereof.

While devices are available for performing blood interchange functions, deficiencies and hazards exist in connection with their use; and these hazards and deficiencies often restrict use of these devices to emergency conditions in which no other alternative is available. In one type of existent blood oxygenator small oxygen bubbles are blown through the blood, while in another the blood is directed to take the form of a film covering one or more vertical screens which are situated in an atmosphere of oxygen. In still another, the blood is disposed in the form of a film on rotating discs which are located in an atmosphere of oxygen; and still another employs layers of membranous sheets which are permeable to oxygen and carbon dioxide. These physically separate the blood from the oxygen while still permitting an oxygenation of the blood.

Moreover, one common form of artificial kidney utilizes a tubular membrane structure similar to a sausage casing. This structure is formed from cellophane or other permeable material; and the blood to be purified passes along one side of the membrane structure, as for example, inside the tube, and the purifying liquid, usually a form of Ringer's solution, passes along the other side of the membrane structure, as for example, outside the tube, so that a transfer of the waste products in the blood to the liquid may be effected.

Some of the major defects of prior interchange devices include the large volume of blood necessary for priming of the apparatus, the difficulty of cleaning, preparing, assembling and sterilizing the components, and, in the case of oxygenators, the inadequate oxygenating capacity and the possibility of forming gas bubbles within the blood. Such bubbles can lead to a fatal gas embolism in the experimental animal or actual patient that is served by the interchange device.

The present invention therefore has among its objects the production of a blood interchange arrangement which substantially eliminates such hazards and deficiencies, which has a high capacity with relatively small bulk and which is readily adjustable as to capacity.

Another object of the invention is to provide such an arrangement which is capable of relatively high volumetric flow and, while capable of sterilization and reuse, is sufficiently inexpensive that it may be employed with disposable elements to insure perfect operation in use.

Still another object of the invention is to provide a blood interchange device which employs a diffusion membrane in the form of a high turn multiple spirally configurated tubing whereby to achieve an extremely high transfer or interchange membrane area relative to the volume of fluid involved and whereby to achieve a resultantly high space efficiency.

A further object of the invention is to minimize the volume of blood needed to prime the apparatus.

A still further object of the invention is to make the blood clearly visible at all times, as to inspect for the formation of bubbles within the blood stream.

And a still further object of the invention is to provide a blood interchange device that is arranged for withdrawal of any such bubbles.

A yet further object of the invention is the production of a blood interchange arrangement which readily adapts itself to a sectional design, permitting a high degree of flexibility with respect to the number of units employed.

And a yet further object of the invention is to provide a blood interchange arrangement that adequately removes carbon dioxide from the blood passed therethrough.

A specific object is the provision of a high capacity extracorporeal lung arrangement characterized by a tubular casing defining a blood flow passage containing capillary multiple parallel oxygen flow tubes of silicone rubber and each of multiple turn spiral configuration collectively to occupy a substantial portion of the volume of the blood flow passage.

Another specific object is the provision of an artificial implantable lung characterized by a tubular casing defining a blood flow passage containing capillary multiple parallel oxygen flow tubes of silicone rubber and each of multiple turn spiral configuration collectively to occupy a substantial portion of the volume of the blood flow passage.

A further specific object is the provision of a high capacity extracorporeal kidney arrangement characterized by a tubular casing defining a blood flow passage containing multiple parallel dialysing liquid flow tubes each of multiple turn spiral configuration collectively to occupy a substantial portion of the volume of the blood flow passage.

Still a further specific object is the provision of an artificial implantable kidney employing the principles of this invention.

In the drawings:

FIG. 1 is a side elevational view of an extracorporeal artificial blood oxygenator embodying an interchange arrangement of the present invention;

FIG. 2 is a top plan view of the blood oxygenator with the end portions thereof broken away approximately on the line 2—2 of FIG. 1 to disclose the details of construction;

FIG. 3 is an enlarged sectional view taken approximately on the line 3—3 of FIG. 2;

FIG. 4 is a transverse cross sectional view taken approximately on the line 4—4 of FIG. 3;

FIG. 5 is a transverse cross sectional view taken approximately on the line 5—5 of FIG. 2;

FIG. 6 is a perspective view of an artificial implantable lung arrangement;

FIG. 7 is a top plan view of an extracorporeal artificial kidney embodying an interchange arrangement of the present invention;

FIG. 8 is a transverse cross sectional view taken approximately on the line 8—8 of FIG. 7;

FIG. 9 is a transverse cross sectional view taken approximately on the line 9—9 of FIG. 7; and FIG. 10 is a perspective view of an artificial implantable kidney.

EXTRACORPOREAL ARTIFICIAL LUNG

The present invention contemplates an extracorporeal artificial lung employing a housing structure which may be formed from a suitably transparent material whereby to permit examination of the contents. This housing structure includes inlet and outlet means for the blood to be purified and contains an interchange assembly employing multiple turn spirally configurated capillary tubing, the interchange assembly functioning as a diffusion membrane to permit oxygen to be transferred into the blood and carbon dioxide to be transferred from the blood into the interchange assembly from which it may be discharged. Thus, the action is similar to alveolar exchange in the normal lung.

Referring now in detail to the drawings, specifically to FIG. 1, the reference numeral 1 indicates extra corporeal blood oxygenator comprising a plurality of tubular units or cells 2 which are formed from a suitable resinous plastic or other rigid material. The material for the cells 2 is preferably one that is both capable of withstanding sterilization and transparent. The units are aligned on a common axis and clamped together between end members or closure plates 3 and 4, by suitable means such as threaded rods 5 and cooperable wing nuts 6 which may bear on washers 7. The rods 5 are preferably threaded throughout their entire length whereby additional units 2 may be assembled or units removed as may be desired.

The end members 3 and 4 are formed from a resinuous plastic material such as that employed in connection with the units 2. Extending from the end member 3 is a pair of inlet tubes 8, hereinafter termed the "inlets," which may likewise be formed from a plastic material corresponding to that of the end plates, tubes 8 being suitably cemented or fusion welded to the end plates 3 and 4 to form a fluid tight joint therebetween. In like manner, the end plate 4 may be provided with an outlet tube 9, hereinafter referred to as the "outlet." Thus, blood may flow into the structure through inlets 8 and, following the desired interchange, may flow out of the structure through the outlet 9.

As will be apparent from a reference to FIGS. 2 and 5, each unit 2 comprises a tubular casing or shell 11 which is fabricated from cylindrical tubing and which is provided with an annular groove or channel 12 in one of its end walls 13, the opposite end wall being unbroken. Extending across the interior of the shell 11 adjacent the last mentioned end thereof is a foraminous element such as a woven or perforated screen 14 or the like which is firmly supported within the shell, as for example by forming the peripheral edges of the element 14 and producing a press fit between such edges and the interior surface of the shell. Disposed in each of the channels 12 are annular gasket rings 15 which are placed under compression when the units 2 are clamped together by the rods 5 and nuts 6, thereby effectively sealing the joint between each unit and between the end wall 3 and the adjacent unit. As the end wall 13 of the shell 11 which is adjacent the end member 4 does not contain a sealing gasket, the end member 4 may be provided with a like annular groove 12 and an annular gasket ring 15 thereby sealing the joint between the end wall and the adjacent unit and thus forming a closed fluid tight housing for the passage of blood from the inlets 8 to the outlet 9.

Continuing with reference to FIGS. 2 and 5, high turn multiple spirally configurated capillary tubing 16 occupies a substantial portion of the volume of each unit 2. In the preferred form, such tubing comprises twenty unbroken lengths, each being five feet long and arranged in a suitable coil to provide a large external surface area exposed to blood flowing through the device. At the same time, the volume of tubing within the unit reduces the actual blood volume within the unit to a minimum and thus reduces the volume of blood necessary to prime the structure.

Connection of the ends 17 and 18 of the tubing 16 is accomplished by a cement bond to inlet and outlet manifold tubes 19 and 21 which extend through the sidewall of the shell 11, the ends of the twenty lengths of tubing 16 being assembled in multiple strand configuration and inserted and cemented in the ends of the manifold tubing, as is best shown in FIGS. 3 and 4. The manifold tubes 19 and 21 are passed directly through the wall of the shell 11 and are secured to the shell 11 in fluid tight relation by cementing, bonding or other suitable means.

To facilitate the withdrawal of any entrapped bubbles from the interior of the unit, each of the units is provided with a petcock 22 having a manually actuatable control valve element 23. If desired, the petcock may be connected to the shell 11 by a short section of transparent tubing 24 which may function as a trap for accumulated air or gas from which the same may then be expelled through the petcock 22. The transparent tubing 24 enables the operator to determine visually when all air or gas has been expelled, as well as the presence of a bubble and thus the necessity for expelling the same.

Also extending between the end members 3 and 4 is a pipe or tube 25 and a pipe or tube 26, each of which may function as either a supply or discharge manifold. Each tube is provided with a plurality of tube connecting means, such as nipples 27. The nipples which are carried by the pipe 25 are connected to the manifold tubes 19; and in like manner, the nipples which are carried by the pipe 26 are connected to the manifold tubes 21. The tubes 25 and 26 are each closed at one by suitable cap members 28; but if desired, the latter may be of a removable type so that tubing may be operatively attached thereto for connecting such tube with another tube of a similar apparatus, Two or more of the end members may be provided with slots 29 to permit adjustment of the corresponding end member longitudinally along the tubes 25 and 26, in the event the number of units is to be reduced.

OPERATION OF EXTRACORPOREAL OXYGENATOR

In the oxygenator arrangement the tubing 16 is constructed of a material having suitable permeability or diffusibility for the gases involved, namely oxygen and carbon dioxide, and thereby permitting its use as a dialysis membrane. I have found that a silicone rubber known under the trade name "Silastic S–2000" has excellent characteristics for the desired purpose, although other materials, such as ethyl cellulose derivatives and polytetrafluoroethylene, have sufficiently suitable characteristics for the purpose.

The size of the tubing 16 is governed primarily on the requirement of exposing the maximum amount of surface or membrane area to the blood stream per unit volume of the latter, which is consistent with the tube capacity that is necessary to accommodate the supply of oxygen and withdrawal of carbon dioxide. Thus, if the tube diameter becomes unduly large, the surface area becomes diminished. On the other hand, use of a tube that is too small results in an insufficient supply of oxygen and insufficient withdrawal of carbon dioxide. I have found that very satisfactory results may be obtained with silicone rubber tubing having an internal diameter of 0.012 inch and an external diameter of 0.025 inch, although tubing having an internal diameter up to one-sixteenth of an inch and having a wall thickness of from five to sixteen mils appears practical, the length of tubing, however, being determined in accordance with the lesser or greater area afforded by the particular tubing involved.

Apparatus employing such tubing may be readily built in compact assemblies. Thus, units 2 can be readily designed to accommodate approximately one hundred feet of tubing per unit, each such unit having an internal diameter of approximately two and one-quarter inches and an axial length of approximately one inch. An assembly incorporating twenty such units contains approximately two thousand feet of tubing and has an overall length of less than two feet, the end members being approximately four inches by four inches square. I have found that approximately twelve thousand feet of tubing provides an adequate capacity for use in connection with adult human beings. This requirement may be satisfied by six assemblies of twenty units each. Such an arrangement is small enough to be arranged on a portable rack or other supporting device as is desirable.

In use, the blood to be oxygenated enters the inlets at a suitable rate, passing over the tubing to be discharged from the outlet 9 of the last assembly in the series. It will be particularly noted that, as the respective assemblies have a substantial portion of their volume filled with tubing, the blood is distributed in a relatively fine film over the various coils of the tubing so that the actual volume of blood in each assembly is relatively small. Hence, a large amount of blood is not needed initially to prime the system. In addition, as a result of such small volume and large distribution thereof, very efficient ratios of blood quantity to surface area are achieved. The blood flow through the assembly normally approximates that of the patient on which it is used, and the oxygen flow usually runs approximately five liters per minute with a normal range of from two to eight liters per minute depending upon specific requirements.

It will be particularly noted that this construction insures an adequate amount of oxygenation capacity to meet any specific requirement, requires a minimum amount of blood in priming the apparatus and reduces the possibility of formation and passage of bubbles into the body of the patient. Also, the construction readily adapts itself for cleaning, preparing, assembling and sterilizing of the various parts, eliminating any danger of contamination by deposits of blood remaining on the parts of the device from one operation to another. Further, the construction of the units 2 is such that they may be readily reusable with or without fresh tubing. Thus, the shells 11 may be cleaned and sterilized with or without the tubing; and if desired, either the tubing or the entire unit may be treated as a disposable item and replaced for each operation.

A feature of the presently preferred embodiment of the artificial extracorporeal lung is the presence of the multiple parallel gas passageways afforded by the twenty lengths of capillary tubing 16. The utilization of multiple fluid paths between the manfold tubes 25 and 26 enables a substantial increase in the volumetric flow to be achieved, and when a number of the tubular units 2 are assembled for use as an oxygenator or artificial lung, a substantial reduction in the carbon dioxide level in the processed blood is achieved simultaneously with the oxygenation of the blood.

The capillary tubing 16 is loosely configurated in the cavity of each unit 2, and where the total length of such tubing is 100 feet per unit, the volume occupied by the tubing constitutes a substantial portion of the volume of the mounting cavity; for example, one-half to three-quarters of such volume. This relationship reduces the volume of blood required to fill the unit and therefore minimizes the amount of blood needed to prime the system. It is important that a low volume of blood be sufficient to fill the completed units 2, as this minimizes the amount of blood required to be withdrawn from the patient being served by the oxygenator.

Where the capillary tubing 16 is flexible and loosely mounted it can respond to the currents in the flowing blood and avoid substantially the development of cavitation effects in the mounting of the tube. Elimination of cavitation substantially reduces the possibility of formation of gas bubbles in the blood.

IMPLANTABLE ARTIFICIAL LUNG

In accordance with another embodiment of the invention, as shown in FIG. 6, there is provided an oxygenator or artificial lung for intra-corporeal application. The prosthetic lung designated generally at 32 in FIG. 6 is arranged to serve not as a replacement for a lung, but as a ventilatory booster or third lung for patients with diffuse pulmonary disease, such as emphysema. As in the case of the extracorporeal oxygenator arrangement, the artificial lung 32 is dependent upon blood-gas exchange of carbon dioxide and oxygen by diffusion through a membrane in the form of capillary tubing. The lung comprises an elongated casing 33 having its opposite ends connected as an Edwards Arterial Graft, to provide a blood passage functioning as a right to left blood shunt from the pulmonary artery to the left auricle. The casing 33 is fabricated from a relatively inert material, such as a woven polytetrafluorethylene and may have an overall length of about ten to twenty inches, and a transverse diameter of about ⅝" to 1". The casing has a corrugated exterior surface affording a certain amount of flexibility but it is sufficiently stiff to define an interior cavity of substantially fixed volume. Opposite ends of the casing are connected by sutures as indicated at 34 and 35 and the blood flow is along the direction indicated by the arrow in FIG. 6.

Strands of capillary tubing 36 of silicone rubber are shown loosely configurated in multiple turn random spiral arrangement to occupy a substantial portion of the volume enclosed by the casing 33. An extracorporeal source of oxygen (not shown) is connected to a gas inlet tube 37 and a gas outlet tube 38 which are passed through the chest wall of the patient and through the wall of the casing 33 at any convenient locations. These gas flow tubes 37 and 38 are permanently sealed to the casing 33 in any suitable fashion consistent with the use of the device as an implant. The inlet and outlet tubes 37 and 38 are preferably silicone rubber. The strands of capillary tubing have their opposite ends assembled in a multiple strand configuration which is inserted into the corresponding tubes 37 and 38 and secured therein by an adhesive mend 39.

The inlet and outlet tubes may be of ¼" diameter to receive ten strands of capillary tubing 36 having an internal diameter of 0.012 inch and an external diameter of 0.025 inch.

It will be understood that oxygen enters through the inlet tube 37 and follows ten parallel passageways presented by the strands of capillary tubing 36 as it finds its way through the casing, with the outlet tube 38 providing for exhaustion of carbon dioxide and the unused oxygen.

EXTRACORPOREAL ARTIFICIAL KIDNEY

The invention contemplates an extracorporeal artificial kidney which is shown in FIGS. 7, 8 and 9 and which preferably employs a transparent tubular housing comprised of a plurality of tubular cells 102 aligned on a common axis and clamped together between end closure plates 103 and 104 by means of a pair of threaded rods 105 and wing nuts 106. The rods 105 are threaded throughout their entire length to enable adding on or removing any desired number of cells 102. The end member 103 is equipped with a pair of inlet tubes 108 suitably cemented or fusion welded in place and the end member 104 is equipped with a single outlet tube 109. In the kidney arrangement blood will be connected to flow into the inlet 108 to pass through the tubular units 102 in succession and emerge from the outlet tube 109.

Each of the cells 102 consists of a shell 111 provided with an annular groove to receive a gasket ring 115 on one of its end walls 113. A woven screen 114 is fitted within one end of each cell 102 to provide a structural barrier without impeding blood flow between the units.

As is best seen in FIGS. 7 and 8, each of the cells 102 is provided with high turn multiple spirally configurated tubing 116 arranged to occupy a substantial portion of the volume of the cavity defined by each such cell. By way of example, it is preferred to employ 100 feet of tubing in each cell 102. In the preferred form the tubing is arranged in ten 10 foot lengths each of which is spirally configured into a coil form that is extensively distributed throughout the cavity to provide a large external surface area exposed to blood flowing through the device.

The tubing 116 as shown in FIGS. 7 to 9, normally has an internal diameter ranging from $\frac{1}{16}$ to $\frac{1}{8}$ of an inch. It is formed from a material having the required dialyzing characteristics necessary for a proper interchange between the blood and the purifying solution employed. A purifying liquid solution of the type known as "Ringer's solution" is ordinarily selected. Materials having suitable characteristics for the tubing are found in various cellulose compounds, as for example methyl cellulose and that marketed under the trade name "Cellophane". There are currently available on the market products intended specifically for this purpose which are known as regenerated cellulose dialysis tubing. The tubing 116 has a relatively thin wall thickness in the neighborhood of 0.0008 to 0.002 inch. An extracorporeal artificial kidney requires approximately 20,000 square centimeters of area and where each cell has 100 feet of tubing 116 having a wall thickness of 0.001 inch, this area can be obtained with several assemblies of the type illustrated.

Connection of the ends 117 and 118 of the tubing 116 is accomplished by a cement mend to inlet and outlet manifold tubes 119 and 121, respectively, which extend through the side wall of the shell 111 with the ends of 10 lengths of tubing 116 being assembled in multiple strand configuration and inserted and cemented in the ends of the manifold tubes 119 and 121. The manifold tubes 119 and 121 pass directly through the side wall of the shell 111 and are secured in fluid tight relation by cementing, bonding, or other suitable means. A petcock 122 having a manually actuatable control valve handle 123 is shown mounted on the unit in FIG. 8 to facilitate withdrawal of any entrapped bubbles from the blood passage constituted by the unit. The end closure members 3 and 4 also mount a supply manifold pipe 125 and a discharge manifold pipe 126, each pipe being provided with nipples 127 for connection to the manifold tubes 119 and 120.

The artificial kidney 101 is shown in FIG. 7 connected in a closed loop system that includes a pump 128 and a dialyzing bath 129. The supply pipe 125 leads from the discharge side of the pump 128 and the return pipe 126 leads to the bath 129, with the bath being connected to the suction side of the pump 128.

In use as an artificial kidney, the flow rate of both the dialyzing liquid and the blood is not critical, and the blood will normally flow at rates varying from 10 cc. to 500 cc. per minute, the dialyzing liquid having a proportionate rate under the conditions involved.

With this arrangement, all of the waste materials, electrolytes, sugar and urea pass through the membrane and are expelled, leaving primarily the larger plasma proteins, blood cells and bacteria.

It will be apparent that the speed of transfer depends upon a number of factors, as, for example, the concentration of the components of the Ringer's solution, the thickness of the membrane, and the total amount of membrane surface area which is employed.

Because the final results are a function of the several variables involved, a change in one variable may be offset or countered by a corresponding change in another variable. For example, with a reduction in surface area the apparatus can be run for a longer period of time to achieve the same degree of elimination; and in like manner, by suitable variations, the most desirable operation for the particular problem may be utilized. The construction obviously has the same general advantages referred to in connection with its use as an oxygenator.

A feature of the extracorporeal artificial kidney is the provision of multiple parallel liquid passageways afforded by the 10 lengths of tubing 116 which are incorporated in each cell 102. The use of multiple liquid paths between the manifold tubes 125 and 126 enables a substantial increase in the volumetric flow and facilitates efficient interchange and efficient elimination of the waste materials which diffuse into the tubing from the blood. The volume occupied by the tubing is about one-half to three-quarters of the volume of the mounting cavity in which it is located, to reduce the volume of blood required to fill the unit and therefore minimize the amount of blood needed to prime the system.

IMPLANTABLE ARTIFICIAL KIDNEY

Another embodiment of the invention is illustrated in FIG. 10 wherein a prosthetic kidney designated generally at 132 is arranged at its opposite ends to be sutured to an artery and a vein. The implantable kidney 132 may be provided in the thigh of the patient or at any other suitable location and it comprises an elongated casing 133 having its ends connected to the artery and vein to provide a blood passage for flow of blood in the direction indicated by the arrow. The casing 133 is fabricated from a relatively inert material such as woven polytetrafluoroethylene and may have an overall length of about 10 to 20 inches and a transverse diameter of about 1 inch. The casing 133 has a corrugated exterior surface affording a certain flexibility, but it is sufficiently stiff to define an interior cavity of substantially fixed volume.

Strands of tubing 136 of similar size and wall thickness to that described in relation to FIGURES 7 to 9 are loosely configured in multiple turn random spiral arrangement to occupy a substantial portion of the cavity defined by the casing. An extracorporeal source of dialyzing liquid not shown is connected to a liquid inlet tube 137 and to a liquid outlet tube 138 which lead through the wall of the casing at any convenient locations. These tubes 137 and 138 are permanently sealed to the casing 133 in any suitable fashion consistent with the use of the device as an implant. The strands of tubing have their opposite ends assembled in a multiple strand configuration which is inserted into the corresponding tubes 137 and 138 and secured therein by an adhesive mend 139. The inlet and outlet tubes may be $\frac{1}{2}$ inch in diameter to receive 10 strands of tubing 136 having a diameter of about $\frac{1}{8}$ of an inch and a wall thickness of about .001 inch.

It will be understood that the dialyzing liquid enters through the tube 137 and divides to follow ten parallel passageways presented by the strands of tubing 136, as it finds its way through the casing 133, with the outlet tube 138 providing for exhaustion of waste materials and the unused purifying liquid.

It will be appreciated from the above description that I have provided an extremely simple yet highly efficient structure for performing interchange functions, which structure is highly and readily adaptable to meet specific requirements in individual cases and which offers a greatly increased ratio between the surface area of the exposed membrane relative to the unit volume of fluid being treated.

The specific dimensions given herein are based upon average applications and the utilization of currently available materials, it being conceivable that future developments will result in materials having, or capable of being produced with, characteristics more favorable for the particular application than materials now at hand.

Having thus described my invention, it will be obvious to those skilled in the art from the disclosure herein given that various immaterial modifications may be made in the same without departing from the spirit of the invention; and hence, I do not wish to be understood as limiting myself to the exact form, construction, arrangement and combination of parts herein shown and described, or to the uses mentioned.

What is claimed is:

1. A device for use in effecting blood interchange functions including: a tubular casing defining an interior cavity of substantially fixed volume and constituting a filled-full blood flow passage; individual diffusion membrane capillary tubing means forming ten or more parallel passageways for a blood interchange fluid, said tubing means being of inside tube diameter of about 0.012 to 1/8 inch, each tubing means being arranged in extensively distributed multiple turn spiral configuration throughout said cavity collectively to occupy a substantial portion of the volume thereof and present a large effective exterior surface for immersion in and direct contact with blood passing through said cavity, thereby limiting the blood priming requirement of the cavity while maximizing the blood contact interface presented by the tubing means, and common means connected with each tubing means for effecting one way flow of blood interchange fluid therethrough for diffusion exchange with blood flowing through said cavity.

2. An extracorporeal device for use in effecting blood interchange functions including: means maintaining a plurality of tubular casing members stacked in endwise communicating axial alignment to constitute a filled-full blood flow passage, a blood inlet at one end of said passage and a blood outlet at the other end thereof, each tubular casing member defining an interior cavity of substantially fixed volume and constituting a section of the filled-full blood flow passage; separate diffusion membrane tubing means mounted in the cavity of each casing member and forming separate passageways for a blood interchange fluid, said tubing means being of a tube diameter many times less than any dimension through its cavity and arranged in extensively distributed high turn multiple spiral configuration throughout such cavity to occupy a substantial portion of the volume thereof and present a large effective exterior surface for immersion in and direct contact with blood passing through said cavity, thereby limiting the blood priming requirement of the cavity while maximizing the blood contact interface presented by the tubing means, and means connecting said tubing means in parallel for effecting one way flow of blood interchange fluid therethrough for diffusion exchange with blood flowing serially through said passage.

3. An artificial implantable device for use in effecting blood interchange functions and including an elongated flexible tubular casing having opposite ends adapted for permanent grafting in open communication to visible blood supply and blood return streams, said casing defining an elongated interior cavity of substantially fixed volume constituting a filled-full one way blood flow passage when connected between said streams, individual diffusion membrane capillary tubing means forming ten or more parallel passageways for a blood interchange fluid, said tubing means being of inside tube diameter of about 0.012 to 1/8 inch each tubing means being arranged in extensively distributed multiple turn spiral configuration throughout said cavity collectively to occupy a substantial portion of the volume thereof and present a large effective exterior surface for immersion in and direct contact with blood passing through said cavity, thereby limiting the blood priming requirement of the cavity while maximizing the blood contact interface presented by the tubing means, and common means connected with each tubing means for effecting one way flow of blood interchange fluid therethrough for diffusion exchange with blood flowing through said cavity.

4. An extracorporeal device for oxygenation of blood including: means maintaining a plurality of tubular casing members stacked in endwise communicating axial alignment to constitute a continuous filled-full blood flow passage having a blood inlet at one end and a blood outlet at the other end, said casing members being assembled in fluid-tight relationship, each tubular casing member defining an interior cavity of substantially fixed volume and constituting a section of the filled-full flow passage for blood to be oxygenated; separate capillary diffusion membrane tubing means mounted in the cavity of each casing member and forming a passageway for oxygen, said tubing means being of a diameter many times less than any dimension through its cavity and arranged in extensively distributed high turn multiple spiral configuration throughout such cavity to occupy a substantial portion of the volume thereof and present a large effective exterior surface for immersion in and direct contact with blood passing through said cavity, and means connected with each said tubing means for effecting one way flow of oxygen therethrough, thereby limiting the blood priming requirement of each cavity while maximizing the blood contact interface presented by the tubing means therein, with oxygen diffusing from each tubing passageway into the corresponding cavity to oxygenate the blood and with carbon dioxide diffusing from the blood into each tubing passageway to be carried away by the one way flow therethrough.

5. Blood oxygenating apparatus comprising: a plurality of tubular members, each defining an interior cavity of substantially fixed volume, disposed in axial alignment to form a filled-full, blood transfer passage; a closure member disposed at each of the aligned tubular members; a plurality of connecting rods extending between said closure members and adjustably secured thereto operatively to place said tubular members under compression; gasket means disposed between adjacent tubular members and between the closure members and the tubular members adjacent thereto whereby to form said tubular members and closure members into a fluid-tight assembly; blood inlet means at one of said closure members; blood outlet means at the other of said closure members; inlet means and outlet means for oxygen coupled to each of said tubular members in communication with the interior thereof; and several lengths of capillary tubing disposed in each of said tubular members wth opposite ends connected to the inlet and outlet means thereof to form a passageway therebetween for said blood interchange fluid, said capillary tubing being arranged in extensively distributed multiple turn spiral configuration throughout its cavity collectively to occupy a substantial portion of the volume thereof to present a large effective exterior surface for immersion in and direct contact with blood passing through said cavity, means connected to the last named inlet and outlet means for effecting one way flow of oxygen through said lengths of tubing, said tubing limiting the blood priming requirement of the cavity while maximizing the blood contact interface presented by the tubing means, with oxygen diffusing from each said tubing passageway into said cavity to oxygenate the blood and with carbon dioxide diffusing from the blood into each tubing passageway to be carried away by one way flow therethrough.

6. Apparatus according to claim 5 which further comprises a supply manifold for said blood interchange fluid extending between said closure members and conduit means operatively connecting said supply manifold with the oxygen inlet means for each of said tubular members.

7. Apparatus in accordance with claim 5 wherein each length of tubing comprises silicone rubber tubing having an internal diameter of from approximately 0.012 inch to 0.0625 inch and a wall thickness of from approximately 0.005 inch to 0.016 inch.

8. An artificial implantable lung for oxygenation of blood including: an elongated flexible walled tubular casing having opposite ends for connection as an Edward's arterial graft as a blood shunt from the pulmonary artery to the left auricle, said casing defining an elongated interior cavity of substantially fixed volume constituting a filled-full one way blood flow passage, individual diffusion membrane capillary tubing means forming ten or more parallel passageways for oxygen, said tubing means being of inside tube diameter of about 0.012 to 1/8 inch each tubing means being arranged in extensively distributed multiple turn spiral configuration throughout said cavity collectively to occupy a substantial portion of the volume thereof and present a large effective exterior surface for immersion in and direct contact with blood passing through said cavity, and common means connected with each tubing means for effecting one way flow of oxygen therethrough, thereby limiting the blood priming requirement of the cavity while maximizing the blood contact interface presented by the tubng means, with oxygen diffusing from each said tubing passageway into said cavity to oxygenate the blood and with carbon dioxide diffusing from the blood into each tubing passageway to be carried away by the one way flow therethrough.

9. An extracorporeal device for purifying blood including: means maintaining a plurality of tubular casing members stacked in endwise communicating axial alignment and held in fluid-tight relationship to constitute a continuous filled-full blood flow passage having a blood inlet at one end and a blood outlet at the other end, each tubular casing member defining an interior cavity of substantially fixed volume and constituting a section of the filled-full flow passage for blood to be purified; separate diffusion membrane tubing means mounted in the cavity of each casing member and forming a plurality of parallel passageways for purifying fluid, said tubing means being of a diameter many times less than any dimension through its cavity and arranged in extensively distributed high turn multiple spiral configuration throughout such cavity to occupy a substantial portion of the volume thereof and present a large effective exterior surface for immersion in and direct contact with blood passing through said cavity, and common means connected with each said tubing means for effecting one way flow of purifying liquid therethrough, thereby limiting the blood priming requirement of each cavity while maximizing the blood contact interface presented by the tubing means therein, with purifying fluid diffusing from each tubing passageway into the corresponding cavity to purify the blood and with waste material diffusing from the blood into each tubing passageway to be carried away by the one way flow therethrough.

10. Blood purifying apparatus comprising: a plurality of tubular members, each defining an interior cavity of substantially fixed volume, disposed in axial alignment to form a filled-full, blood transfer passage; a closure member disposed at each of the aligned tubular members; said tubular members and closure members being assembled into a fluid-tight assembly; blood inlet means at one of said closure members; blood outlet means at the other of said closure members; inlet means and outlet means for a blood purifying liquid coupled to each of said tubular members in communication with the interior thereof; and several lengths of tubing disposed in each of said tubular members with opposite ends connected to the inlet and outlet means thereof to form a passageway therebetween for said blood purifying fluid, said tubing being arranged in extensively distributed multiple turn spiral configuration throughout its cavity collectively to occupy a substantial portion of the volume thereof to present a large effective exterior surface for immersion in and direct contact with blood passing through said cavity, means connected to the last named inlet and outlet means for effecting one way flow of blood purifying liquid through said lengths of tubing, said tubing limiting the blood priming requirement of the cavity while maximizing the blood contact interface presented by the tubing means, with purifying fluid diffusing from each said tubing passageway into said cavity to purify the blood and with waste material diffusing from the blood into each tubing passageway to be carried away by the one way flow therethrough.

11. Apparatus according to claim 10 in which the purifying fluid is a dialyzing liquid and which further comprises a supply manifold for said dialyzing liquid extending between said closure members, conduit means operatively connecting said supply manifold with the dialyzing liquid inlet means for each of said tubular members, a return manifold for said dialyzing liquid extending between said closure members, a conduit means connecting said return manifold with the dialyzing liquid outlet means for each of said tubular members, and a pump and dialyzing liquid both connected in series circuit relation with said manifolds.

12. Apparatus in accordance with claim 10 wherein each length of tubing has an internal diameter of from approximately one-sixteenth of an inch to one-eighth of an inch and has a wall thickess of approximately 0.001 inch.

13. An artificial implantable kidney for purifying blood including: an elongated flexible walled tubular casing having opposite ends for connection as a graft between an artery and a vein, said casing defining an elongated interior cavity of substantially fixed volume constituting a filled-full one way blood flow passage, individual diffusion membrane capillary tubing means forming ten or more parallel passageways for a dialyzing liquid, said tubing means being of inside tube diameter of about 0.012 to 1/8 inch each tubing means being arranged in extensively distributed multiple turn spiral configuration throughout said cavity collectively to occupy a substantial portion of the volume thereof and present a large effective exterior surface for immersion in and direct contact with blood passing through said cavity, and common means connected with each tubing means for effecting one way flow of dialyzing liquid therethrough, thereby limiting the blood priming requirement of the cavity while maximizing the blood contact interface presented by the tubing means, with purifying fluid diffusing from each said tubing passageway into said cavity to purify the blood and with waste material diffusing from the blood into each tubing passageway to be carried away by the one way flow therethrough.

References Cited

UNITED STATES PATENTS

| | | | |
|---|---|---|---|
| 2,650,709 | 9/1953 | Rosenar et al. | 210—321 |
| 2,715,097 | 8/1955 | Guarino | 210—8.5 |
| 2,864,506 | 12/1958 | Hiskey | 210—321 |
| 2,972,349 | 2/1961 | De Wall | 23—258.5 |
| 3,015,331 | 1/1962 | Warrick | 23—258.5 |
| 3,333,583 | 8/1967 | Bodell | 128—142 |

OTHER REFERENCES

Brown et al., Surgery, vol. 40, No. 1, July 1956, pp. 100–6, 111–112. 128/H–L Digest.

Guarino et al., Science, vol. 115, March 1952, pp. 285–288. 128/H–L Digest.

Kolff et al., Jo. Lab. and Clin. Med., vol. 47, No. 6, June 1956, pp. 969–77. 128/H–L Digest.

Kolff et al., Cleveland Clinic Quart., vol. 23, No. 2, April 1956, pp. 69–79. 128/H–L Digest.

DALTON L. TRULUCK, Primary Examiner

U.S. Cl. X.R.

23—258.5; 210—321